(No Model.)
S. C. WILCOX.
ATTACHMENT FOR JEWELERS' LATHE CHUCKS
No. 460,077. Patented Sept. 22, 1891.
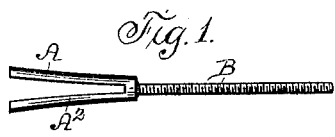
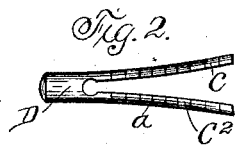
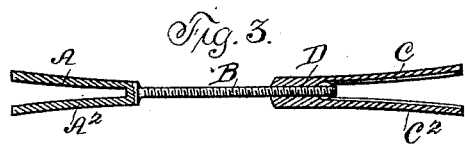
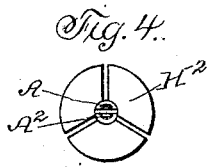
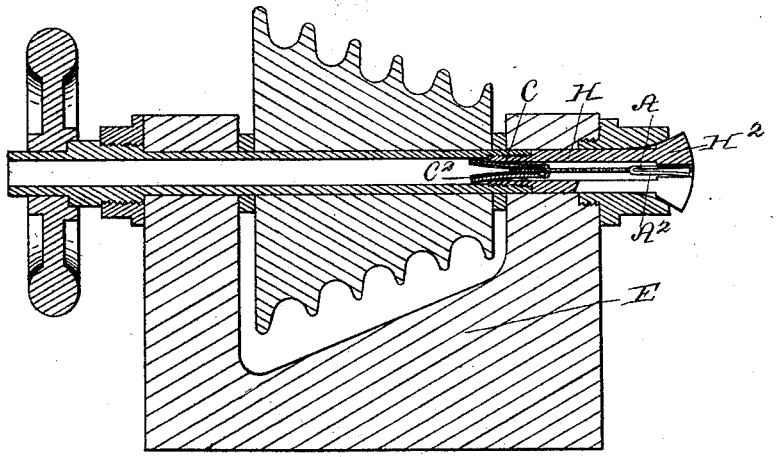

UNITED STATES PATENT OFFICE.

STEPHEN C. WILCOX, OF DES MOINES, IOWA, ASSIGNOR TO WALTER L. SEEBURGER, OF SAME PLACE.

ATTACHMENT FOR JEWELERS' LATHE-CHUCKS.

SPECIFICATION forming part of Letters Patent No. 460,077, dated September 22, 1891.

Application filed March 21, 1891. Serial No. 385,900. (No model.)

*To all whom it may concern:*

Be it known that I, STEPHEN C. WILCOX, a citizen of the United States, residing at Des Moines, in the county of Polk and State of Iowa, have invented a new and useful Attachment for Jewelers' Lathe-Chucks, of which the following is a specification.

My invention relates more particularly to that class of chuck used in jewelers' lathe-work known as the "split chuck."

My invention has as its object the provision of means by which the article to be placed within the chuck may be securely held by the same in the required position, which shall be entirely independent of any means of attachment to the lathe, and which may be readily removed from or adjusted within the chuck relatively to the article to be operated upon.

My invention consists in a pair of frictional binding wings or stems having a head from which said wings project, said head being perforated and screw-threaded to receive and adjustably hold the screw-threaded shank of a pair of bearing-wings, the frictional wings, together with the head, being adapted for insertion within the chuck from the rear end thereof and bind securely within the chuck, while the bearing-wings are inserted from the opposite and forward end of the chuck, the screw-threaded shank thereof extending rearwardly from the front end or head of the chuck and engaged within and by the screw-threads of the perforation in the head of the frictional wings.

Reference may now be had to the following detailed description and the accompanying drawings, in which—

Figure 1 is a detail view of the bearing-wings and extending shank. Fig. 2 is a like view of the head and extending projecting frictional wings. Fig. 3 is a like view of the parts shown joined together. Fig. 4 is an end view of the head of a split chuck and the attachment in position. Fig. 5 is a sectional view of a lathe-head and chuck therein, my improved attachment being in the position assumed when in practical use.

A A² designate bearing-wings, connected to which is the extended screw-threaded shank B, Fig. 1.

C C² designate frictional wings projected from the head D, which head is perforated and screw-threaded within said perforation. I preferably groove or cut the frictional wings at $a$, so that they may more firmly bind in place.

In Fig. 5, E designates a lathe-head, within which is adjusted in the usual manner a split chuck H of ordinary form, an end view of the head H² of which is shown in Fig. 4.

The manner of adjustment of my improved attachment within the chuck H and its operation and function therein are as follows: The head D of the frictional wings C C² is preferably first inserted within the rear open end of the chuck H until the said wings becoming compressed, by virtue of their resiliency, bind firmly and securely within the chuck, after which the shank B is inserted at the front end of the chuck until its free end enters the perforation in the head D of the frictional wings C C², which latter are now firmly held in the chuck. By rotating the bearing-wings A A² and shank B the threads of the latter mesh with those in the perforation of the head D, when the said bearing-wings A A² are retracted within the interior of the chuck, and being at the same time compressed they also bind that portion of the attachment within the chuck firmly in position. By means of a screw-driver the operator may adjust the bearing-wings A A² to any desired point within the chuck. As an instance, it is well known that watch-jewels are of varying sizes, and consequently have varying sizes of shoulders. If it be desired to turn a jewel of a given size, the operator inserts the end of the screw-driver between the bearing-wings A A² from the front of the chuck, Fig. 4, and rotates the shank B, when the ends of the said wings are retracted to that point at which the jewel may be held firmly by the chuck and find a stop or bearing against the ends of the wings A A². When the chuck is tightened within the lathe by the spindle, the bearing-wings and frictional wings are still further compressed. It is obvious that this attachment is held firmly in the chuck at all points by means of the springing frictional wings and the bearing-wings and is entirely independent of the lathe except for the further compression of the wings, dispensing with the necessity of any devices secured to the lathe for regulating the parts in the chuck. The ends of the wings A A² also provide a bearing-point which is constantly in one position within the chuck and therefore rotates in a true manner with the chuck, this result being accomplished by reason of their firm attachment within the chuck and their independence of the lathe. It is also obvious that the attachment may be readily removed from or adjusted within the chuck when desired.

Having thus described my invention, what I claim as new, and desire to secure by Letters Patent, is—

1. In an attachment for lathe-chucks, the springing frictional wings, in combination with the springing bearing-wings, and means for securing said frictional and bearing wings adjustably together, as set forth.

2. The combination, with a lathe-chuck of the class described, of a pair of springing binding-wings adapted to remain stationary within the chuck, and a pair of springing bearing-wings, and means of securing and adjusting the latter relatively to the binding-wings, as set forth.

STEPHEN C. WILCOX.

Witnesses:
W. L. SEEBURGER,
C. C. BULKLEY.